United States Patent
Raniere

(10) Patent No.: US 9,838,166 B2
(45) Date of Patent: Dec. 5, 2017

(54) DATA STREAM DIVISION TO INCREASE DATA TRANSMISSION RATES

(71) Applicant: FIRST PRINCIPLES INC., Albany, NY (US)

(72) Inventor: Keith A. Raniere, Albany, NY (US)

(73) Assignee: FIRST PRINCIPLES, INC, Albany, NY (US)

(*) Notice: Subject to any disclaimer, the term of this patent is extended or adjusted under 35 U.S.C. 154(b) by 0 days.

(21) Appl. No.: 15/257,661

(22) Filed: Sep. 6, 2016

(65) Prior Publication Data
US 2016/0373220 A1 Dec. 22, 2016

Related U.S. Application Data

(63) Continuation of application No. 14/027,629, filed on Sep. 16, 2013, now Pat. No. 9,438,385, which is a
(Continued)

(51) Int. Cl.
*H04L 12/28* (2006.01)
*H04L 5/00* (2006.01)
(Continued)

(52) U.S. Cl.
CPC .......... *H04L 5/0001* (2013.01); *H04W 28/08* (2013.01); *H04L 12/66* (2013.01); *H04W 48/18* (2013.01)

(58) Field of Classification Search
CPC .................... H04L 1/0041; H04N 21/6125
See application file for complete search history.

(56) References Cited

U.S. PATENT DOCUMENTS

H001175 H  4/1993  Giorgio
5,390,239 A  2/1995  Morris et al.
(Continued)

FOREIGN PATENT DOCUMENTS

EP   2374319 A1  10/2011
JP   2000307598 A  11/2000
(Continued)

OTHER PUBLICATIONS

International Search Report & Written Opinion for PCT/US2013/059661, dated Jan. 3, 2014; 28 pages.
(Continued)

*Primary Examiner* — Charles C Jiang
*Assistant Examiner* — Will Lin
(74) *Attorney, Agent, or Firm* — Schmeiser, Olsen & Watts, LLP

(57) ABSTRACT

A method and system for transmitting data is provided. The method includes receiving by a first interface device, data. The data is divided into a plurality of data packets and stored within an internal buffer. A first group of data packets are transmitted to a network node communicatively coupled to the first interface device. The first group of data packets are transmitted from the first communication device to a second interface device via a first communication network. A second group of data packets are transmitted to a first communication device communicatively coupled to the first interface device. The second group of data packets are transmitted from the first communication device to the second interface device via a second communication network associated with the first communication device.

20 Claims, 8 Drawing Sheets

Related U.S. Application Data continuation-in-part of application No. 13/613,230, filed on Sep. 13, 2012, now Pat. No. 9,100,904.

(51) Int. Cl.
*H04W 28/08* (2009.01)
*H04J 3/06* (2006.01)
*H04W 48/18* (2009.01)
*H04L 12/66* (2006.01)

(56) References Cited

U.S. PATENT DOCUMENTS

| | | | |
|---|---|---|---|
| 5,809,070 A | 9/1998 | Krishnan et al. | |
| 5,918,021 A | 6/1999 | Aditya | |
| 6,198,749 B1 | 3/2001 | Hui et al. | |
| 6,577,653 B1 | 6/2003 | Rochberger et al. | |
| 6,842,446 B2 | 1/2005 | Everson et al. | |
| 6,993,050 B2 | 1/2006 | Desai et al. | |
| 7,177,284 B2 | 2/2007 | Peleg | |
| 7,315,538 B2 | 1/2008 | Wright et al. | |
| 7,424,040 B2 | 9/2008 | Walden | |
| 7,532,562 B2 | 5/2009 | Ridel et al. | |
| 7,630,412 B2 | 12/2009 | Wright et al. | |
| 7,725,587 B1* | 5/2010 | Jacoby | H04L 63/1416 709/217 |
| 7,933,298 B2 | 4/2011 | Wright et al. | |
| 9,100,904 B2 | 8/2015 | Raniere | |
| 9,438,385 B2 | 9/2016 | Raniere | |
| 2003/0210663 A1* | 11/2003 | Everson | H04W 28/06 370/329 |
| 2004/0190444 A1 | 9/2004 | Trudel et al. | |
| 2005/0232304 A1 | 10/2005 | Quigley | |
| 2006/0098573 A1 | 5/2006 | Beer et al. | |
| 2006/0133430 A1* | 6/2006 | Nagesh | H04J 3/1617 370/536 |
| 2006/0182152 A1 | 8/2006 | Bi et al. | |
| 2007/0147234 A1 | 6/2007 | Walter | |
| 2009/0092137 A1 | 4/2009 | Haigh et al. | |
| 2010/0154044 A1* | 6/2010 | Manku | H04L 12/5691 726/7 |
| 2010/0198969 A1 | 8/2010 | Jacoby et al. | |
| 2011/0213827 A1* | 9/2011 | Kaspar | H04W 76/025 709/203 |
| 2011/0219142 A1 | 9/2011 | Lin et al. | |
| 2011/0235651 A1 | 9/2011 | Martinez et al. | |
| 2011/0275359 A1 | 11/2011 | Sebire | |
| 2011/0289559 A1 | 11/2011 | Jacoby et al. | |
| 2012/0033673 A1 | 2/2012 | Goel | |
| 2012/0076016 A1 | 3/2012 | Robbins | |
| 2012/0110393 A1 | 5/2012 | Shieh | |
| 2012/0196579 A1* | 8/2012 | Souissi | H04L 25/14 455/414.4 |
| 2013/0003760 A1 | 1/2013 | Schwager | |
| 2013/0029731 A1 | 1/2013 | Fuchigami et al. | |
| 2013/0139166 A1 | 5/2013 | Zhang | |
| 2013/0304875 A1 | 11/2013 | Kaspar et al. | |
| 2013/0322255 A1 | 12/2013 | Dillon | |

FOREIGN PATENT DOCUMENTS

| | | |
|---|---|---|
| JP | 2002261854 A | 9/2002 |
| JP | 2008142150 A | 6/2008 |
| JP | 2008306321 A | 12/2008 |
| RU | 2308813 C2 | 10/2007 |
| WO | 2008097254 A1 | 8/2008 |
| WO | 2010063119 A1 | 6/2010 |

OTHER PUBLICATIONS

Final Office Action for U.S. Appl. No. 14/730,421, filed Jun. 4, 2015, dated May 31, 2016.
Extended Search Report for EP Application No. 13836962.4, dated Apr. 29, 2016.
Office Action for U.S. Appl. No. 14/730,421 (filed Jun. 4, 2015), dated Apr. 24, 2017.
Office Action for U.S. Appl. No. 15/286,151 (filed Oct. 5, 2016), dated on Apr. 24, 2017.
1st Chinese Office Action for CN Application No. 201380047991.3, dated Jul. 13, 2017.
Russian Search Report for Appliction No. 2015111414/07 (17804), dated Jul. 12, 2017.
Mexican Office Action for application No. MX/a/2015/003059, dated Jun. 22, 2017.
Translation of the Japanese Office Action Application No. 2015-532076, dated Sep. 6, 2017.
Australian Office Action for Application No. 2013315239, dated Oct. 27, 2016.
Australian Office Action for Application No. 2013315239, dated Jun. 7, 2017.
Mexican Office Action for application No. MX/a/2015/003059, dated May 6,2016.

\* cited by examiner

DATA STREAM DIVISION TO INCREASE DATA TRANSMISSION RATES

CROSS-REFERENCE TO RELATED APPLICATIONS

This application is a continuation of U.S. application Ser. No. 14/027,629, filed Sep. 16, 2013, entitled "Data Stream Division to Increase Data Transmission Rates," now U.S. Pat. No. 9,438,385, which is a continuation-in-part of U.S. application Ser. No. 13/613,230 filed on Sep. 13, 2012, and entitled "Data Stream Division to Increase Data Transmission Rates," now U.S. Pat. No. 9,100,904.

FIELD OF TECHNOLOGY

The following relates to a method and associated system for dividing a data stream into multiple data packets and utilizing more than one communication path to transmit the data packets in order to optimize communication reliability and speed based on various needs.

BACKGROUND

Transmitting information typically comprises a time consuming process with little flexibility. Accordingly, there exists a need in the art to overcome at least some of the deficiencies and limitations described herein above.

SUMMARY

A first aspect relates generally to a method comprising: receiving, by a first interface device comprising a computer processor, first data; dividing, by the computer processor, the first data into a plurality of data packets; storing, by the computer processor, the plurality of data packets in one or more data buffers comprised by the first interface device; transmitting, by the computer processor, a first group of data packets of the plurality of data packets to a first network node communicatively coupled to the first interface device, wherein a first subgroup of data packets of the first group of data packets is transmitted from the first network node to a second interface device via a first communication network associated with the first network node, wherein the first subgroup of data packets does not comprise all data packets of the first group of data packets, and wherein the first network node comprises a first plurality of communicatively coupled communication devices; and transmitting, by the computer processor, a second group of data packets of the plurality of data packets to a first communication device communicatively coupled to the first interface device, wherein the second group of data packets are transmitted from the first communication device to the second interface device via a second communication network associated with the first communication device, wherein the second interface device stores the first subgroup of data packets and the second group of data packets within an internal data buffer, wherein the first subgroup of data packets differ from the second group of data packets, wherein the first communication device differs from the first plurality of communicatively coupled communication devices, and wherein the first communication network differs from the second communication network.

A second aspect relates generally to an interface apparatus comprising a computer processor coupled to a computer-readable memory unit, the memory unit comprising instructions that when executed by the computer processor implements a method comprising: receiving, by the computer processor, first data; dividing, by the computer processor, the first data into a plurality of data packets; storing, by the computer processor, the plurality of data packets in one or more data buffers comprised by the first interface device; transmitting, by the computer processor, a first group of data packets of the plurality of data packets to a first network node communicatively coupled to the first interface device, wherein a first subgroup of data packets of the first group of data packets is transmitted from the first network node to a second interface device via a first communication network associated with the first network node, wherein the first subgroup of data packets does not comprise all data packets of the first group of data packets, and wherein the first network node comprises a first plurality of communicatively coupled communication devices; and transmitting, by the computer processor, a second group of data packets of the plurality of data packets to a first communication device communicatively coupled to the first interface device, wherein the second group of data packets are transmitted from the first communication device to the second interface device via a second communication network associated with the first communication device, wherein the second interface device stores the first subgroup of data packets and the second group of data packets within an internal data buffer, wherein the first subgroup of data packets differ from the second group of data packets, wherein the first communication device differs from the first plurality of communicatively coupled communication devices, and wherein the first communication network differs from the second communication network.

A third aspect relates generally to a computer program product, comprising a computer readable storage device storing a computer readable program code, the computer readable program code comprising an algorithm that when executed by a computer processor of an interface apparatus implements a method, the method comprising: receiving, by the computer processor, first data; dividing, by the computer processor, the first data into a plurality of data packets; storing, by the computer processor, the plurality of data packets in one or more data buffers comprised by the first interface device; transmitting, by the computer processor, a first group of data packets of the plurality of data packets to a first network node communicatively coupled to the first interface device, wherein a first subgroup of data packets of the first group of data packets is transmitted from the first network node to a second interface device via a first communication network associated with the first network node, wherein the first subgroup of data packets does not comprise all data packets of the first group of data packets, and wherein the first network node comprises a first plurality of communicatively coupled communication devices; and transmitting, by the computer processor, a second group of data packets of the plurality of data packets to a first communication device communicatively coupled to the first interface device, wherein the second group of data packets are transmitted from the first communication device to the second interface device via a second communication network associated with the first communication device, wherein the second interface device stores the first subgroup of data packets and the second group of data packets within an internal data buffer, wherein the first subgroup of data packets differ from the second group of data packets, wherein the first communication device differs from the first plurality of communicatively coupled communication devices, and wherein the first communication network differs from the second communication network.

A fourth aspect relates generally to a method comprising: receiving, by a first interface device comprising a computer processor, a plurality of data streams; assigning, by the computer processor based on specified criteria, each data stream of the plurality of data streams to a different communication device of a plurality of communication devices, wherein the plurality of communication devices are communicatively coupled to the first interface device, and wherein each communication device of the plurality of communication devices is associated with a different communication network of a plurality of communication networks; transmitting, by the computer processor, a first data stream of the plurality of data streams to a first communication device of the plurality of communication devices, wherein the first data stream is transmitted from the first communication device to a second interface device via a first communication network of the plurality of communication networks associated with the first communication device; and transmitting, by the computer processor, a second data stream of the plurality of data streams to a second communication device of the plurality of communication devices, wherein the second data stream is transmitted from the second communication device to the second interface device via a second communication network of the plurality of communication networks associated with the second communication device, wherein the first data stream differs from the second data stream, wherein the first communication device differs from the second communication device, and wherein the first communication network differs from the second communication network.

A fifth aspect relates generally to a method comprising: receiving, by a first interface device comprising a computer processor, a plurality of data streams; assigning, by the computer processor based on specified criteria, each data stream of the plurality of data streams to a communication device of a plurality of communication devices, wherein the plurality of communication devices are communicatively coupled to the first interface device, and wherein each communication device of the plurality of communication devices is associated with a different communication network of a plurality of communication networks; transmitting, by the computer processor, a first data stream of the plurality of data streams to a first communication device of the plurality of communication devices, wherein the first data stream is transmitted from the first communication device to a second interface device via a first communication network of the plurality of communication networks associated with the first communication device; and transmitting, by the computer processor, the first data stream to a second communication device of the plurality of communication devices, wherein the second data stream is transmitted from the second communication device to the second interface device via a second communication network of the plurality of communication networks associated with the second communication device, wherein the first communication device differs from the second communication device, and wherein the first communication network differs from the second communication network.

BRIEF DESCRIPTION

Some of the embodiments will be described in detail, with reference to the following figures, wherein like designations denote like members, wherein.

Figure 6:
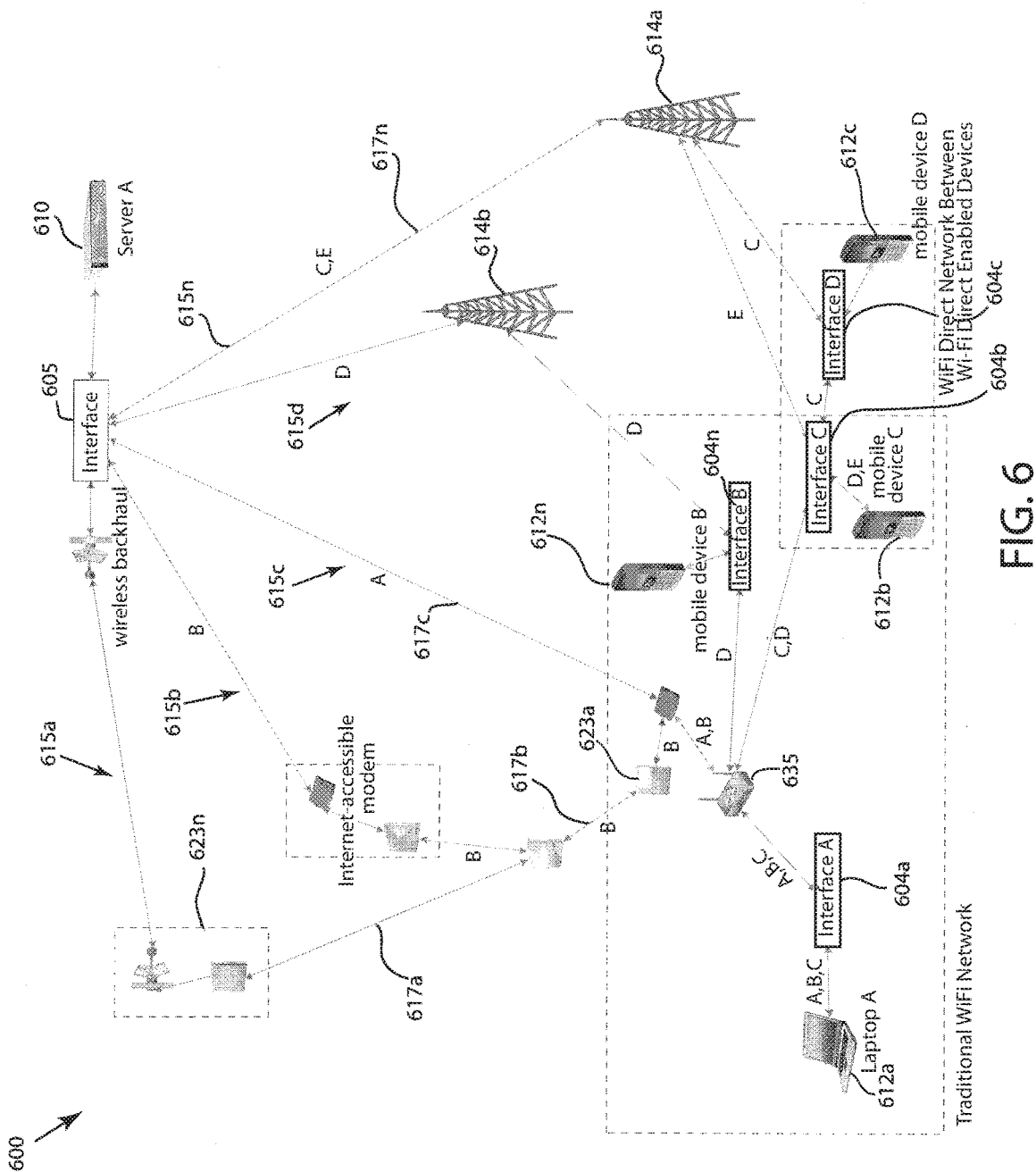
Figure 7:
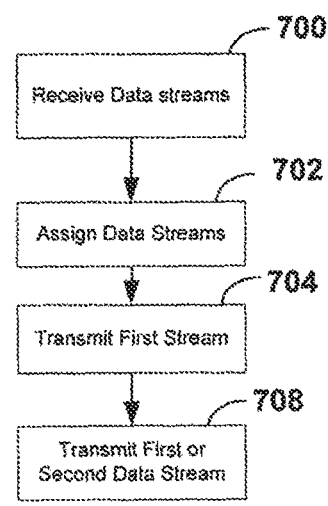
Figure 8:
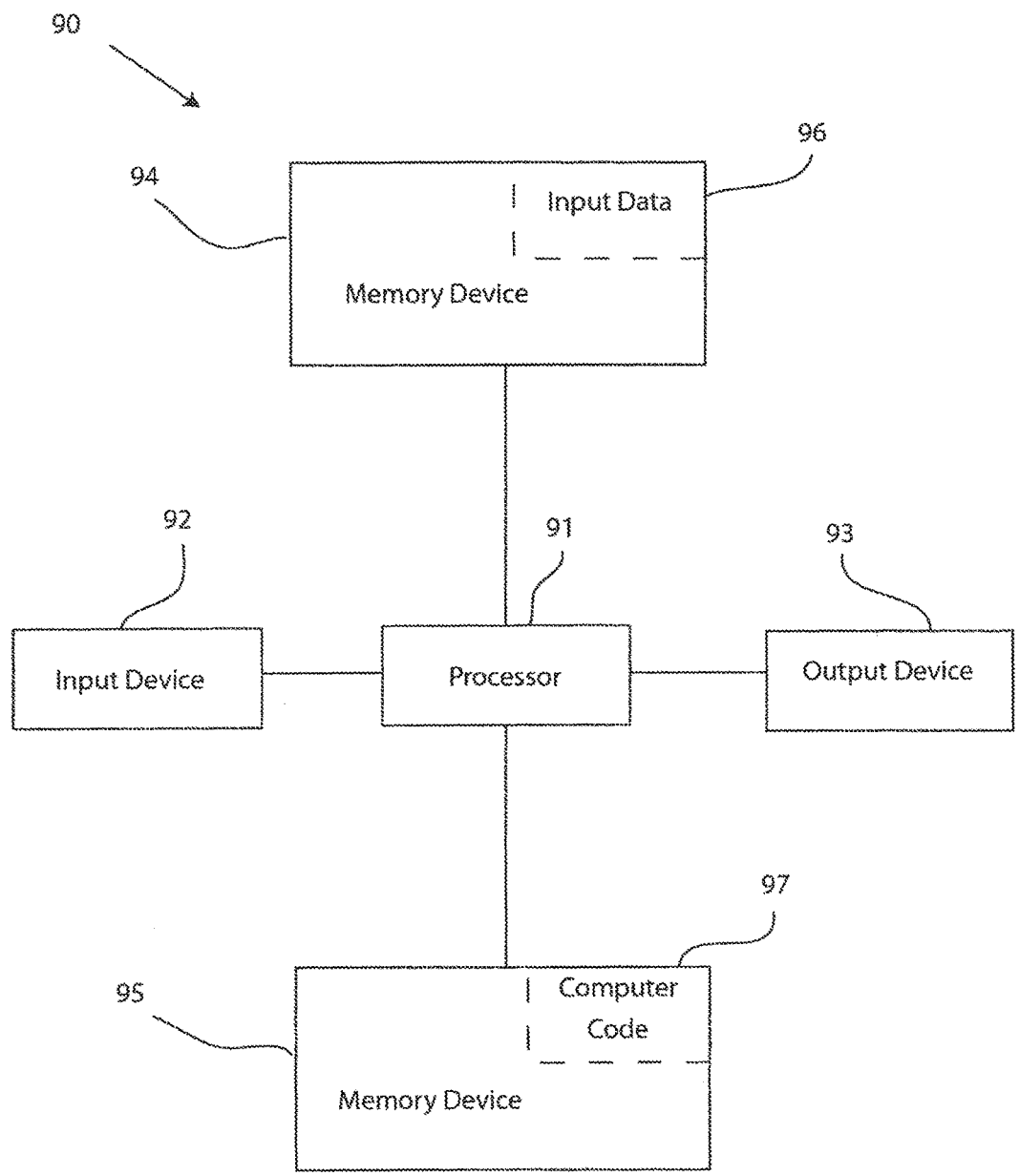

FIG. 6 an embodiment of an alternative system for pooling connections as if they comprise a single connection;

FIG. 7 illustrates an embodiment of an algorithm detailing a process flow enabled by system pooling connections as if they comprise a single connection; and FIG. 8 illustrates an embodiment of a computer apparatus used for allowing interfaces to access multiple available data transmission connections.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
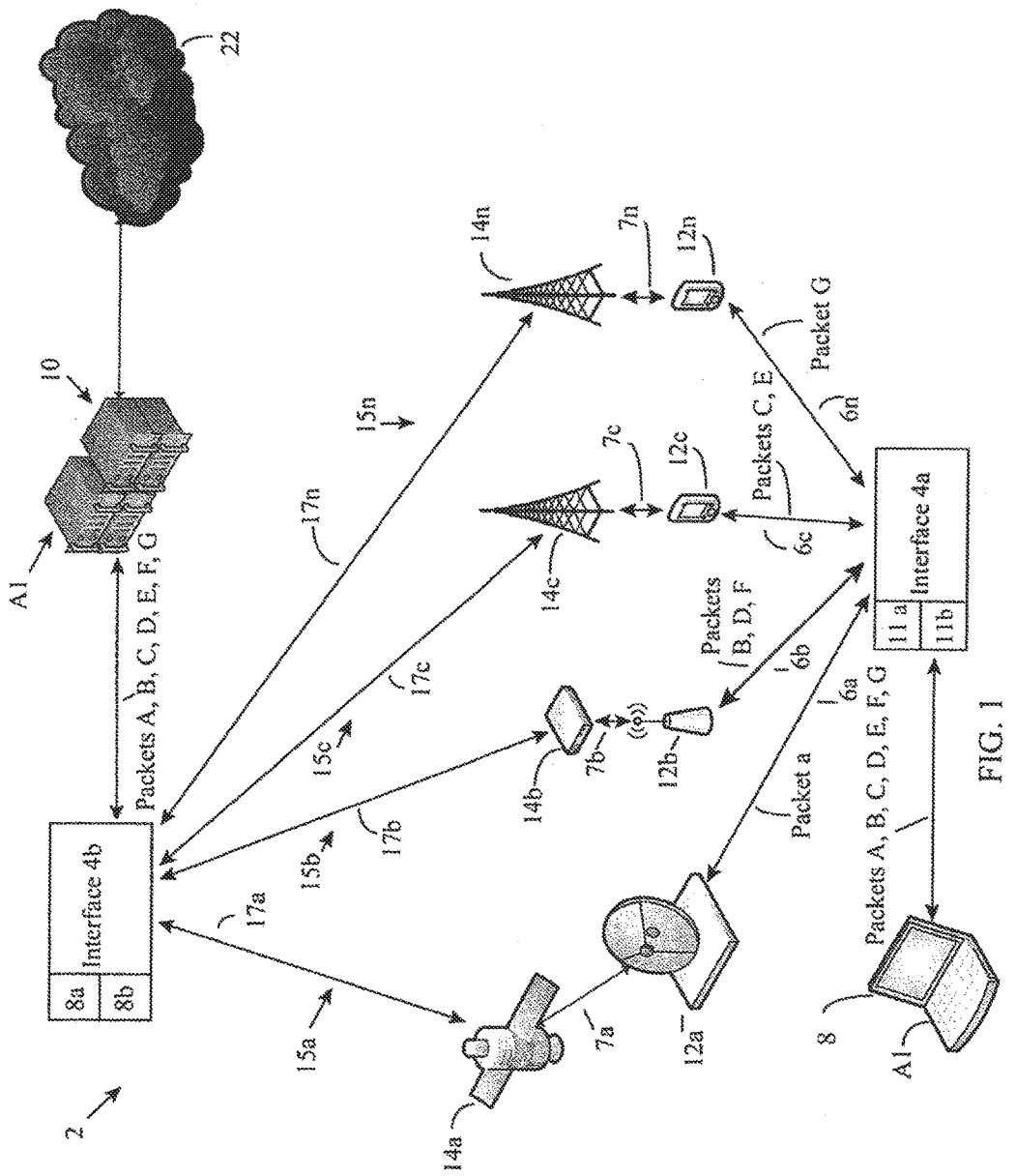
FIG. 1 illustrates an embodiment of a system for allowing interfaces to access multiple available data transmission connections.

Referring to the drawings, FIG. 1 illustrates an embodiment of a system 2 for enabling interfaces 4a and/or 4b to access multiple available data transmission connections. System 2 may utilize any number of the multiple available data transmission connections synchronously and/or on-demand to maximize data transmission rates/quality based on various system and user-defined parameters. Embodiments of system 2 may enable an aggregation of each available connection (or network) into a single data interface (e.g., interfaces 4a and/or 4b) comprising an approximate value of a sum of all the connections aggregated (e.g., an aggregated bandwidth of all of the connections/networks), a seamless connection failover, a prioritization of connection usage based on speed, reliability, cost, etc, a prioritization of data transfer routing based on speed, reliability, etc, and message and data security.

Embodiments of system 2 of FIG. 1 may include devices 8 and 10, interfaces 4a and 4b, network connection devices 12a . . . 12n, networks 15a . . . 15n, and an additional network 22 (e.g., the Internet). Devices 8 and 10 may comprise, inter alia, desktop computers, laptop computers, mobile phones, tablet computers, personal digital assistants (PDA), server computers, mainframe computers, cable modems, wireless routers, etc. Devices 8 and 10 may include communication interfaces associated with different data transmission methodologies such as, inter alia, wired communications, wireless LAN (802.11a,b,g,n) interfaces, microwave interfaces, satellite interfaces, cellular wireless interfaces (e.g., CDMA, 3G, 4G, etc), shortwave radio interfaces, etc. Device 8 may be connected to interface 4a (i.e., wirelessly or via a hardwire connection). Embodiments of interface 4a may be located external to device 8 as illustrated in FIG. 1. Alternatively, embodiments of interface 4a may be located internal to device 8. Embodiments of interface 4a may comprise a hardware interface, a software interface, a virtual interface, or any combination thereof. Interface 4a may comprise multiple internal buffers 7a and 7b for storing data packets prior to transmission and as a backup for transmitted data packets that were not received by a destination device. Device 10 may be connected to interface 44 (wirelessly or via a hardwire connection). Embodiments of interface 4b may be located external to device 10 as illustrated in FIG. 1. Alternatively, embodiments of interface 4b may be located internal to device 10. Interface 4b may comprise a hardware interface, a software interface, a virtual interface, or any combination thereof. Embodiments of interface 4b may comprise multiple internal buffers 8a and 8b for storing data packets prior to transmission and as a backup for transmitted data packets that were not received by a destination device. Embodiments of interface 4a may be connected to a network connection device 12a via a link 6a. Similarly, embodiments of interface 4a may be connected to a network connection device 12b via a link 6b. Embodiments of interface 4a may be connected to a network connection device 12c via a link 6c. Embodiments of interface 4a may be connected to a network connection device 12n via a link 6n. Links 6a . . . 6n may comprise wireless links or hardwired links.

Embodiments of the network connection devices 12a . . . 12n may comprise any type of connection devices including, inter alia, a satellite dish, a wireless access point, a mobile phone, a PDA, etc. Embodiments of network connection device 12a may be connected to interface 4b via network 15a. Embodiments of network 15a may include a network device 14a connecting network connection device 12a to interface 4b via links 7a and 17a. Embodiments of network 15a may comprise any type of network including, inter alia, a satellite network, etc. Embodiments of network device 14a may comprise any type of network device including, inter alia, a satellite, etc. Embodiments of network connection device 12a may be connected to interface 4b via network 15a. Embodiments of network 15b may include a network device 14b connecting network connection device 12b to interface 4b via links 7b and 17b. Embodiments of network 15b may comprise any type of network including, inter alia, a cable TV network, etc. Embodiments of network device 14b may comprise any type of network device including, inter alia, a cable modem, etc. Embodiments of network connection device 12c may be connected to interface 4b via network 15c. Embodiments of network 15c may include a network device 14c connecting network connection device 12c to interface 4b via links 7c and 17c. Embodiments of network 15c may comprise any type of network including, inter alia, a cellular telephone network, etc. Embodiments of network device 14c may comprise any type of network device including, inter alia, a cellular phone tower/infrastructure, etc. Embodiments of network connection device 12n may be connected to interface 4b via network 15n. Embodiments of network 15n may include a network device 14n connecting network connection device 12n to interface 4b via links 7n and 17n. Embodiments of network 15n may comprise any type of network including, inter alia, a cellular telephone network (i.e., differing from or the same as network 15c), etc. Embodiments of network device 14n may comprise any type of network device including, inter alia, a cellular phone tower/infrastructure (i.e., differing from or the same as network device 14c), etc.

With continued reference to FIG. 1, embodiments of system 2 illustrates a data file/stream A1 split (e.g., de-multiplexed) into data packets A . . . G (by device 8) and transferred to interface 4a for transmission to interface 4b and device 10. Alternatively, data file/stream A1 may be directly transferred by device 8 to interface 4a and split up into data packets A . . . G (in real time by interface 4a) for transmission to interface 4b and device 10. Each, some, or at least one of packets A . . . G may be stored within one or more data buffers 11a and 11b internal to interface 4a prior to transmission to interface 4b. For instance, packets A . . . G may be stored within the data buffers 11a and 11b to enable transmission of the data packets A . . . G. Additionally, data packets A . . . G may be stored in the data buffers 11a and 11b so that any of packets A . . . G may be transmitted again if the packet has not been received by a destination device (e.g., interface 4b). Each, some, or at least one of packets A . . . G (or some of data packets A . . . G) may be transmitted to a different one of network connection devices 12a . . . 12n for transmission on a different one of networks 15a . . . 15n. Transmitting different data packets of a data file (e.g., data A1) on different networks may allow for an aggregation of bandwidth from multiple networks. An aggregation of bandwidth from multiple networks can allow a large data file/stream to be transmitted to a destination very quickly. When data packets A . . . G are received by interface 4b, they may be stored within one or more internal data buffers 8a and 8b, transmitted to device 10, and combined (e.g., multiplexed) back into a single data file/stream A1. Alternatively, data packets A . . . G may be received, stored, and combined back into a single data file/stream A1 by interface 4b and the single data file/stream A1 may be transmitted to device 10. Embodiments of the aforementioned data splitting/combining process may be performed in an opposite direction going from device 10 to device 8. The following example 1 describes one embodiments of an implementation scenario (enabled by system 2) for transmitting a plurality of data packets across multiple networks.

EXAMPLE 1

A data file/stream A1 is split into a plurality of data packets A . . . G for transfer to interface 4a. Interface 4a stores the data packets A . . . G (within internal data buffers 11a and 11b) and transmits: data packet A to network 15a via network connection device 12a; data packets B, D, and F to network 15b via network connection device 12b; data packets C and E to network 15c via network connection device 12c; and data packet G to network 15n via network connection device 12n. Data packets A . . . G are received by interface 4b (stored within internal buffers 8a and 8b) and transferred to device 10. Device 10 combines packets A . . . G back into data file/stream A1.

Referring back to FIG. 1, embodiments of system 2, via interface 4a and/or 4b, may enables any one or a combination of the following functions:

1. Aggregation of multiple sources of available bandwidth (i.e., associated with networks 15a . . . 15n) for a device (e.g., device 8 and/or 10) through multiple interface components (e.g., network connection devices 12a . . . 12n) via wired or wireless connections;

2. A failover (e.g., backup) bandwidth for a device (e.g., one of network connection devices 12a . . . 12n). For example, if/when a single connection or infrastructure fails, another connection or infrastructure may be utilized immediately without a loss of a connection;

3. A process for sharing bandwidth between multiple users;

4. A process for alleviating a single point of failure for network connections. The single point of failure may be associated with client hardware, client software, local network hardware/software, an Internet service provider (ISP), etc.;

5. A process enabling secure communications between a user and servers or a user and additional users; and 6. A process enabling best path routing of data to end-users.

Embodiments of system 2 may enable a network accessible device (e.g., devices 8 and 10) to simultaneously employ multiple available network interfaces thereby simultaneously utilizing multiple available network infrastructure and associated bandwidth. Additionally, embodiments of system 2 may enable a network accessible device to employ network interfaces that are not comprised by the device to access additional network resources. Therefore, embodiments of system 2 may enable any network accessible device to utilize an infrastructure and bandwidth of any other network accessible device.

Furthermore, embodiments of system 2 may enable a network accessible device to access and utilize infrastructure and bandwidth of multiple additional network accessible devices as a single network interface for the (parent) network accessible device provided the multiple additional network accessible devices are within a data communication range through a physical or wireless connection.

Additionally, embodiments of system 2 may allow for multiple data transmission protocols/types to be leveraged (e.g., WiFi, 3G, 4G, CDMA, microwave, etc). For instance, embodiments of system 2 may modify the multiple data transmission protocols/types as agnostic in terms of accessibility to (parent) network accessible device. Embodiments of system 2 may enable a network accessible device to aggregate all available bandwidth from all available and accessible network interfaces to generate a large usable upload and download bandwidth for the device. Embodiments of system 2 may enable a network accessible device to automatically (e.g., without losing a network connection) switch to an interface accessible to the network accessible device if the device's primary interface fails on a hardware, software, or network level. For example, if a laptop computer comprises a WiFi network interface and a mobile phone with a tethered or matched data plan and the WiFi network interface fails (e.g., a hardware card in the laptop fails, a driver for the hardware card fails, a wireless router fails, an ISP fails, etc), the laptop computer may automatically begin using the tethered or matched mobile phone for its network access.

Referring still to FIG. 1, embodiments of system 2 may provide a means for a network accessible device to access the Internet (or any data network) through any local available channels or a combination of available local channels. Embodiments of system 2 may enable a single network accessible device to access and leverage all available infrastructures simultaneously and automatically to select a best combination of network interfaces and associated infrastructures (for enhanced performance) based on user and system assigned rules (e.g., use of a polling process). For example, if a first service provider infrastructure is performing poorly or fails, system 2 may automatically reduce a dependency on an associated network by switching (without losing an Internet connection) to another network. Embodiments of system 2 may automatically determine which available channels to leverage based on a channel performance for data transmission to and from the network accessible device. If a single ISP infrastructure fails or decreases, embodiments of system 2 may automatically adjust a data transmission channel usage to provide a best possible performance to the network accessible device. Embodiments of system 2 may also automatically select one or more channels to leverage and an amount of data to transmit across each, some of, or at least one channel.

Moreover, embodiments of system 2 may enable a network accessible device to increase network performance by overcoming ISP enacted bandwidth resource (usage, speeds, accessibility, etc) limitations by enabling a single device (e.g., interface 4a and/or 4b) to connect to other devices through wired or wireless connections that share same ISP resources. Embodiments of interface 4a and/or 4b may utilize bandwidth resources of all or some of the connected devices. Therefore, if a device X (i.e., utilizing interface 4a and/or 4b) is connected to n other devices on a same ISP infrastructure and each device is allotted z resources by an ISP, device X may access approximately (n*z) bandwidth resources. Additionally, interface 4a and/or 4b may enable all interconnected devices to utilize all shared bandwidth resources (i.e., pooled resources).

Embodiments of system 2 may also allow a user to select a defined bandwidth usage. For example, if a user has access through various network interfaces and other local devices to four network infrastructure connections (e.g., networks 15a . . . 15n): the user may choose to maximize bandwidth usage (e.g., aggregate all available bandwidth for use); use any single connection as primary connection and utilize any remaining connections for backup (failover) bandwidth only; or any combination thereof. Additionally, a user may decide to use all channels or networks to ensure a large (e.g., 20 Mb or more) download connection.

Embodiments of system 2 may enable a peer-to-peer sharing of resources and communications directly without network intervention. Both ends of a peer-to-peer connection may utilize n connection interfaces and gain performance and security benefits of an entire system thereby enabling an Internet-type infrastructure without servers.

Embodiments of system 2 may be directly connected to a computer, mobile phone, a home/business modem or wireless router, etc. and aggregated bandwidth may be leveraged by all computers/devices connecting to that network. For example, four phones may be tethered or matched to a home wireless router and all devices connected to the router may access all system benefits (e.g., security, bandwidth, etc).

Embodiments of system 2 dynamically evaluates available channels (associated with network connection devices 12a . . . 12n and networks 15a . . . 15n) for transmitting each data packet using a combination of data associated with: a current state/status for each existing channel; an aggregate/historic data-set associated with each channel; and an analysis of a current queue for each channel (e.g., each channel may comprise a queue of data packets waiting for transmission). Embodiments of system 2 may periodically analyze each, some, or at least one of the available channels for latency and bandwidth. Additional characteristics may be evaluated with respect to transmission of different data packets of a data file (e.g., data 511) on different networks. Characteristics may include, inter alia, throughput characteristics, packet drop rate characteristics, error characteristics, latency characteristics, packet delay variation characteristics, and out-of-order-delivery characteristics. A throughput characteristic defines a bit rate (i.e., a maximum throughput) that may be provided on a specified data channel. A packet drop rate characteristic defines multiple packets transmitted that do not arrive at a destination. Error characteristics define corrupted packets that are dropped en-route to their destination. Latency characteristic define a time elapsed with respect to a packet to be delivered to its destination. A packet delay variation (i.e., jitter) defines a difference in delay (or latency) between packets on a single channel. Analysis results can be added to an aggregate collection of data associated with each, some, or at least one of the channels for a current session as well as historically over multiple past sessions (e.g., via mobile device ID, mobile phone account ID, identifiable wireless network connection, etc). A transmission channel may be selected based upon a current state and a historical performance of that channel at specific intervals. For example, a channel selection may be based upon a sampling of a current state, an average bandwidth/latency/reliability (b/l/r) over the last 5 seconds, an average b/l/r over the last 5 minutes, an average b/l/r for a current session, a lifetime average b/l/r with weighted scores on each data set used for the selection, etc. In the event that all available channels comprise low reliability, system 2 may choose to transmit duplicate packets over multiple channels to increase a likelihood of successful transfer of packets if available bandwidth allows for the performance to be maintained with the available bandwidth. Reliability in the b/l/r set is generally defined as: a channel maintaining consistent end-to-end connection viability (vs. a channel that frequently losses connectivity even for only a few milliseconds), a consistency of latency time vs. a wide range of latency time; a consistent vs. inconsistent bandwidth availability over time; an ISP method for bursting, etc. A result of analysis of current and historical b/l/r for each, some, or at least one of the available channels may be combined with a current queue length for each, some, or at least one of the channels. The analysis may generate a final decision for a transmission channel for a next packet or group of packets. For example, embodiments of system 2 may not transfer packet(s) in a shortest queue if the b/l/r is so low that system 2 determines that it is more likely for the packet to arrive at its destination sooner via a more reliable channel with a longer queue. Therefore, embodiments of system 2 may be enabled to assign different priorities to different packets or packet types so that lower priority packets are sent over lower-rated channels. Additionally, embodiments of system 2 may be enabled to transmit duplicate packets intentionally over multiple channels if one channel is unreliable.

Furthermore, embodiments of system 2 may use historical data associated with one or more channels to determine bursting strategies used by different service providers network or hardware/software interface. For example, a bursting strategy may comprise a company enabling a very large bandwidth (beyond a subscription rate) for a first amount of time (e.g. 10 or 20 seconds) of a download and then throttling the bandwidth available to a user. As system 2 determines bursting strategies for different channels, it may adapt its own decision process for transmitting data over available channels to maximize the use of the providers' bursting strategies. For example, if system 2 determines that a first connection allows a very high bandwidth for 20 seconds after an associated channel unused for 1 minute, it may choose to only utilize the channel for 20 seconds every minute. In this scenario, if a user has three available channels each with a similar bursting strategy, system 2 may attempt to only use a bursting channel and cycle through the 3 channels if system 2 determines that this is a best strategy for maximum overall performance. Additionally, embodiments of system 2 may run tests to establish bursting strategies of unused channels.

Embodiments of system 2 may enable a method for determining a bandwidth and latency of a channel. A reliability of a connection may be determined by an overall consistency of the channel to maintain an active connection over time between system endpoints (e.g., interfaces 4a and 4b). Embodiments of system 2 may calculate a short-term and a long-term bandwidth, latency, and reliability to enable system 2 to determine how viable a channel is and to dynamically assign packets or groups of packets to a channel. In one embodiment, the longer the channel is in use (in a specific session and historically) the greater the ability of system 2 to optimally utilize a channel and develop intelligent channel-utilization strategies. Additionally, system 2 may analyze a physical location (e.g., a GPS location) for a channel analysis or history. For example, a phone connection at a first house may comprise a strong connection while a phone connection at a second house (at a different geographical location) may comprise a weaker connection. Therefore, the two different connections may be evaluated differently.

Embodiments of system 2 may include a series of buffers (e.g., internal to interfaces 4a and 4b) to move data from an original static or streaming data source to transmission channels (interface 4a) and to recompile the data at a receiving point (interface 4b). For instance, embodiments of system 2 may enable the following process for buffer usage:

1. System 2 may enable the data buffers to determine a current aggregate capacity of system 2;

2. A set of data equivalent to a capacity of system 2 over a pre-determined period of time (e.g., 2 seconds, 200 ms, etc) is moved to a transmission buffer;

3. System 2 may determine a number of packets to assign to each channel buffer individually based on each channel's b/l/r, current queue, and overall system intelligence (e.g., known bursting strategies, historical rating, etc); and 4. The packets may be assigned and the process may be repeated until all data has been transmitted.

Figure 2:
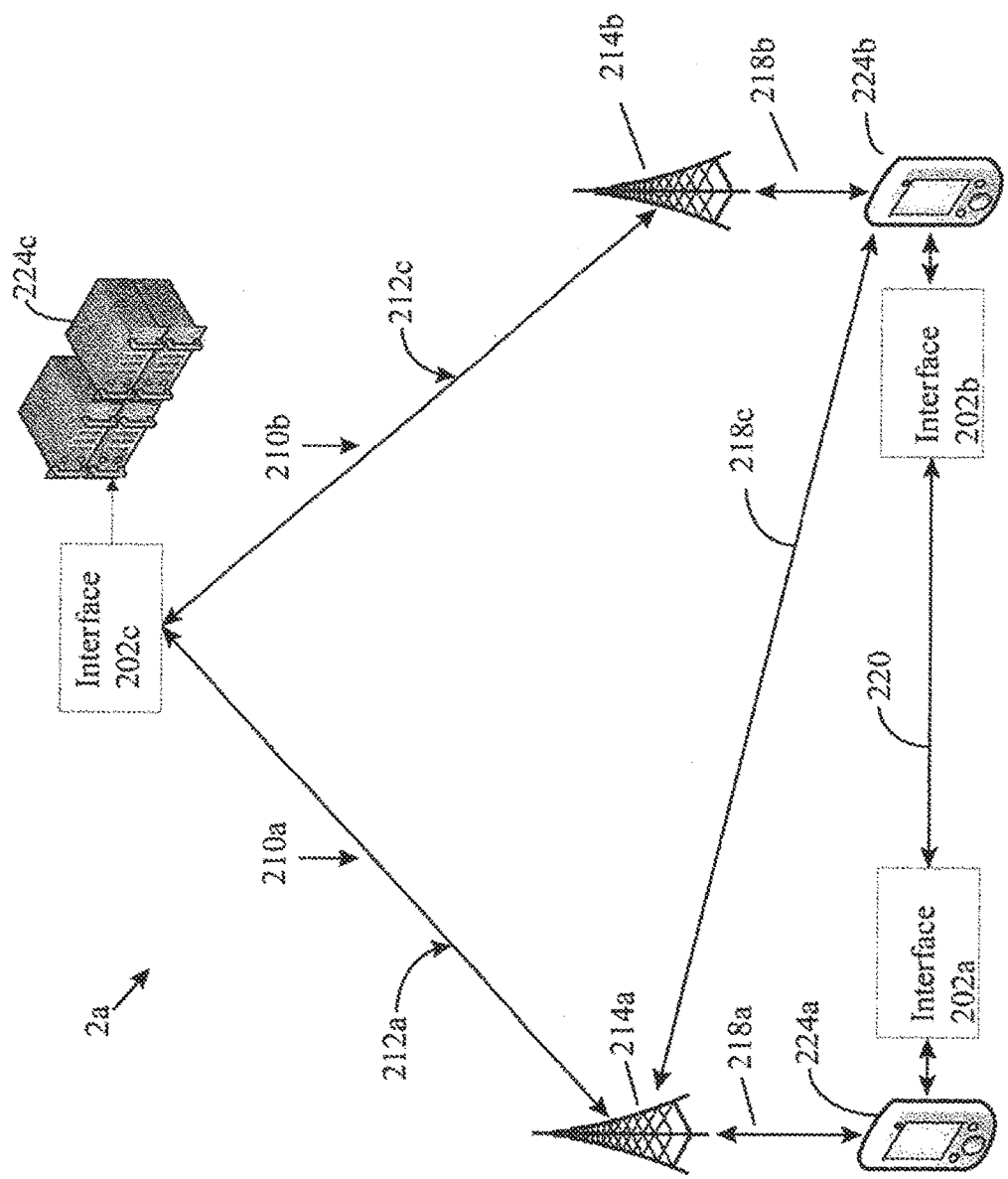
FIG. 2 illustrates an embodiment of an alternative system to the system of FIG. 1 for allowing a device to communicate and share network connectivity with another device.

Referring now to FIG. 2, an embodiment of an alternative system 2a for enabling a device 224a to communicate and share network connectivity with a device 224b is now described. Embodiments of system 2a may enable any network accessible device (e.g., device 224a) to be matched (paired/connected) to any other network accessible device (e.g., device 224b) through a physical connection (e.g., a USB cable connection), a wireless connection, a Bluetooth connection, or any additional local data connection type that can ensure that one of the matched devices (or all) maintains a data signal and/or a voice signal. Embodiments of system 2a may include an ISP/carrier independent system thereby allowing any device (e.g., a cellular phone) to connect to any other device regardless of a specific technology or carrier associated with the device. For example, a cellular phone associated with a network belonging to a first company may be connected to a cellular phone associated with a network belonging to a second (and differing) company. Alternatively, a cellular phone associated with a network belonging to a first company/network may be connected to a cellular phone associated with the same network.

Embodiments of system 2a may include one or more devices 224a and 224b, one or more interfaces 202a, 202b, and 202c, one or more networks 210a and 210b, and a device 224c. Each of interfaces 202a, 202b, and 202c may include multiple buffers as described with respect to interfaces 4a and 4b of FIG. 1. Embodiments of devices 224a, 224b, and 224c may comprise, inter alia, desktop computers, laptop computers, mobile phones, tablet computers, personal digital assistants (PDA), server computers, mainframe computers, cable modems, wireless routers, etc. Embodiments of devices 224a, 224b, and 224c may include one or more communication interfaces associated with different data transmission methodologies such as, inter alia, wireless LAN (802.11a,b,g,n) interfaces, microwave interfaces, satellite interfaces, cellular wireless interfaces (e.g., CDMA, 3G, 4G, etc.), shortwave radio interfaces, etc. Embodiments of device 224a may be connected to an interface 202a (i.e., wirelessly or via a hardwire connection). Embodiments of interface 202a may be located external to device 224a as illustrated in FIG. 2. Alternatively, embodiments of interface 202a may be located internal to device 224a. Embodiments of interface 202a may comprise a hardware interface, a software interface, a virtual interface, or any combination thereof. Embodiments of device 224b may be connected to an interface 202b (i.e., wirelessly or via a hardwire connection). Embodiments of interface 202b may be located external to device 224b as illustrated in FIG. 2. Alternatively, embodiments of interface 202b may be located internal to device 224b. Embodiments of interface 202b may comprise a hardware interface, a software interface, or any combination thereof. Embodiments of device 224c may be connected to an interface 202c (i.e., wirelessly or via a hardwire connection). Embodiments of interface 202c may be located external to device 224c as illustrated in FIG. 2. Alternatively, embodiments of interface 202c may be located internal to device 224c. Embodiments of interface 202c may comprise a hardware interface, a software interface, a virtual interface, or any combination thereof. Embodiments of device 224a may be connected to device 224b via a link 220 (wireless or wired). Embodiments of device 224a may be connected to network 210a via a link 218a. Embodiments of network 210a may include a network device 214a connecting device 224a to interface 202c via link 212a. Embodiments of network 210a may comprise any type of network including, inter alia, a cellular network, a satellite network, etc. Embodiments of network device 214a may comprise any type of network device including, inter alia, a cellular tower, a satellite, etc. Embodiments of device 224b may be connected to network 210b via a link 218b. Additionally, embodiments of device 224b may be connected to network 210a via a link 218c. Embodiments of network 210b may include a network device 214b connecting device 224b to interface 202c via link 212c. Embodiments of network 210b may comprise any type of network including, inter alia, a cellular network, a satellite network, etc. Embodiments of network 210a and network 219b may be comprised by a same network or different networks. Embodiments of network device 214b may comprise any type of network device including, inter alia, a cellular tower, a satellite, etc.

With continued reference to FIG. 2, embodiments of system 2a may enable a process for automatically switching networks if a problem is encountered with one of the networks. For example, if network 210a is disabled (e.g., a network outage due to a malfunction) during communications between device 224a and 224c, system 2a may automatically utilize a connection between devices 224a and 224b (via interfaces 202a and 202b and link 220). The connection between devices 224a and 224b may allow device 224a to communicate with device 224c using network 210b associated with device 224b. The aforementioned process may be additionally enabled to increase a flow of data if network 210a is operating at a less than optimal speed due to increased network traffic.

Figure 3:
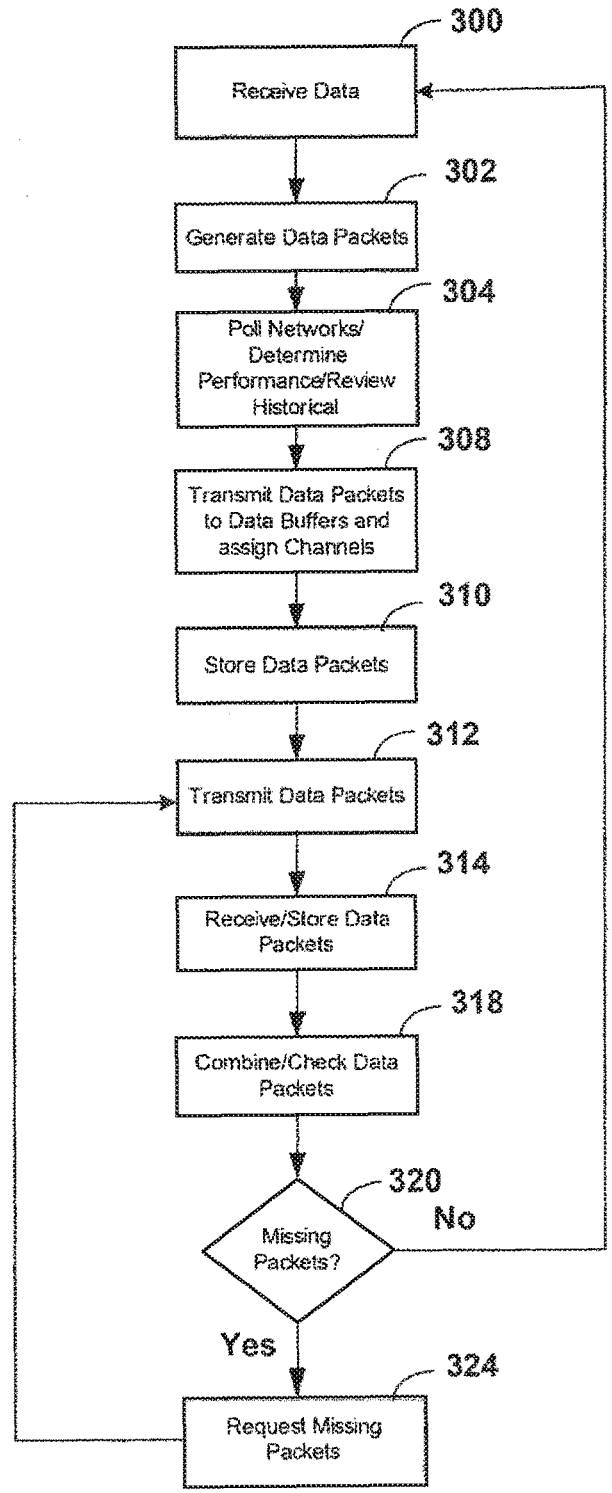
FIG. 3 illustrates an embodiment of an algorithm detailing a process flow enabled by the systems of FIG. 1 and FIG. 2.
Figure 5:
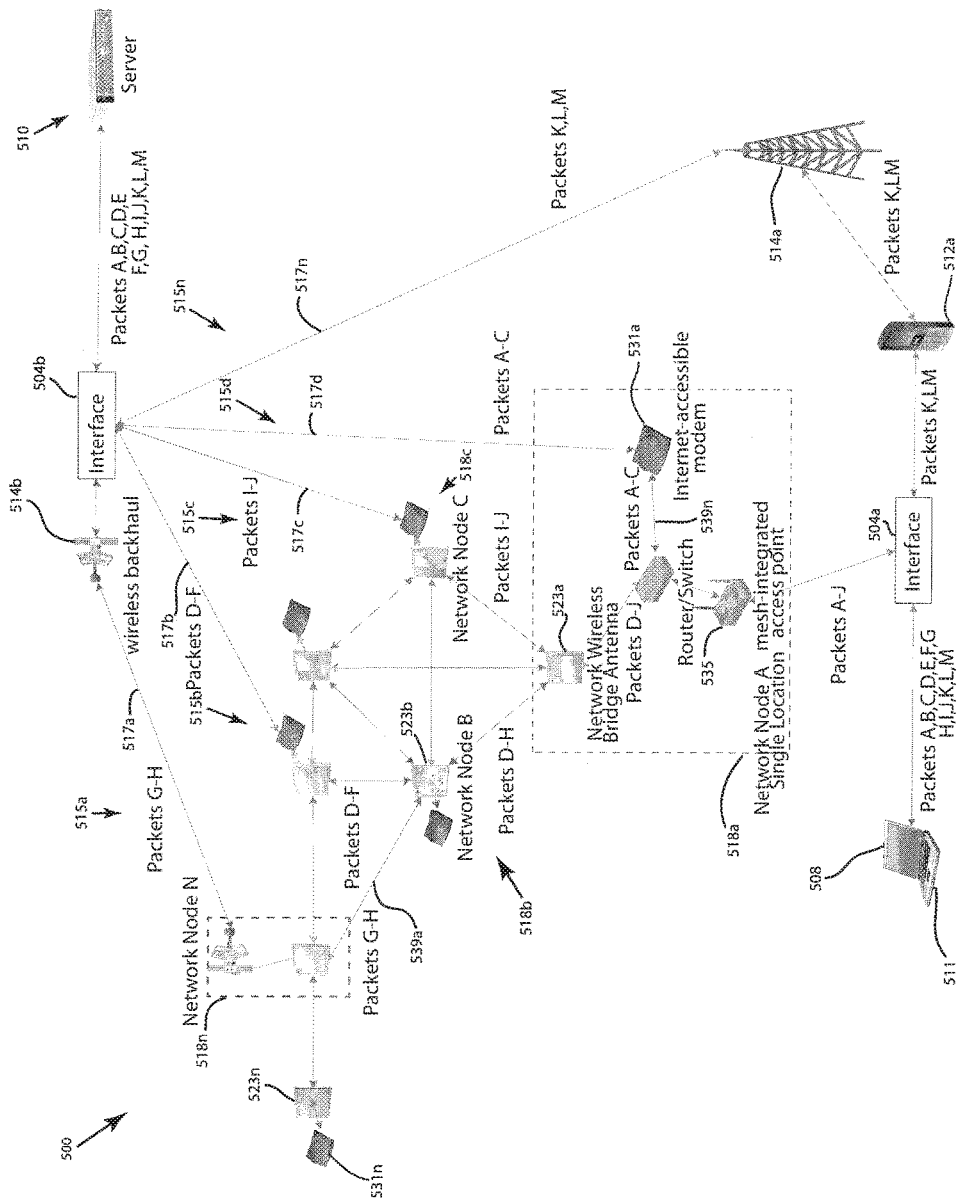
FIG. 5 illustrates an embodiment of an alternative system for enabling interfaces to access multiple available data transmission connections including network nodes for transmission and/or receiving of data.

With further reference to the drawings, FIG. 3 illustrates an embodiment of an algorithm detailing a process flow enabled by system 2 of FIG. 1 or system 500 of FIG. 5 for enabling interfaces to access multiple available data transmission connections. In step 300, a first interface device (e.g., interface device 4a of FIG. 1) may receive data (e.g., from a computer via the Internet). The data may include static data or a data stream. In step 302, the first interface device may divide (i.e., de-multiplexes) the data file into one or more data packets. In step 304, the first interface may optionally poll multiple independent communication networks (e.g., networks 15 ... 15n of FIG. 1), may determine performance/reliability/current network state, and may review historical connection data for various transmission attributes. For example, the first interface optionally may determine, inter alia, network traffic, network data transmission quality, network availability, historical data associated with previous connections, etc. In step 308, the first interface device may transmit the data packets to internal buffers. For example, the data packets may be transmitted to transmission buffer(s) and a re-send buffer. In step 310, the data packets may be stored within specified buffers based on results of the analysis performed in step 304. In step 312, the different data packets (of the data packets) may be transmitted across different networks (of the multiple independent communication networks) based on the results of analysis performed in step 304. As a first example, each, some, or at least one of the networks transmits a different (single) data packet. As a second example, each, some, or at least one of the networks transmits a different group of data packets. Alternatively, data packets may be further split into groups of sub packets and transmitted across a network node(s) (i.e., comprising a plurality of communicatively coupled devices enabled as active electronic devices attached to a network) and/or additional devices and networks. A network node may include a mesh node. In step 314, the transmitted data packets or sub packets may be received by a second interface device (e.g., interface device 4b of FIG. 1) and may be stored within one or more internal buffers. In step 318, the second interface device may combine the data packets and/or sub packets (thereby regenerating the data file). In step 320, it is determined (automatically or manually) if all transmitted data packets and/or sub packets have been received by the second interface device. If in step 320, it is determined that some of the transmitted data packets and/or sub packets have not been received by the second interface device then in step 324, the transmitted data packets and/or sub packets may be re-requested if it is determined that a channel has malfunctioned (e.g., a telephone channel is disabled, a wifi signal is disabled, etc.). In this case, system 2 may re-request all data packets and/or sub packets that were assigned to the disabled channel and were in transit. If system 2 does not detect any disconnected lines, system 2 will determine a specified elapsed time period and transmit the data stream/packets on to a client program. If the missing packet(s) and/or sub packets arrive at a later time, system 2 may transmit the missing packet(s) and/or sub packets immediately as they arrive. If the client program (i.e., an end program using the missing packet(s)) determines that it requires a missing data packet and/or sub packets, it will automatically re-request the missing data via system 2 and steps 300-320 are repeated. In repeated step 318, a reconstituted data stream is delayed for transmission if: (a) a data packet is missing or (b) a later data packet arrives on a same channel as the missing packet was expected. Therefore, a missing packet is assumed lost and a re-combined data packets/stream is transmitted to the client program. If a data packet has not arrived for a period exceeding a latency period (as determined by system 2) of an assigned channel, the packet is considered lost and the system moves on without it. For example, if system 2 determines that a channel X includes a latency period of 75 milliseconds and a packet A arrives at a second interface device and after the 75 millisecond latency period has elapsed, a packet B (a next packet expected by system 2 via Channel X) has not arrived, system 2 assumes the packet B is lost and continues intended functionality. If it is determined (by the client program) that the missing data packet is needed, the client program re-requests the packet and the re-requested packet is processed by system 2. If in step 320, it is determined that all of the transmitted data packets have been received by the second interface device then step 300 may be repeated for a new data file or stream. Steps 318 and 320 may be performed in any order.

Figure 4:
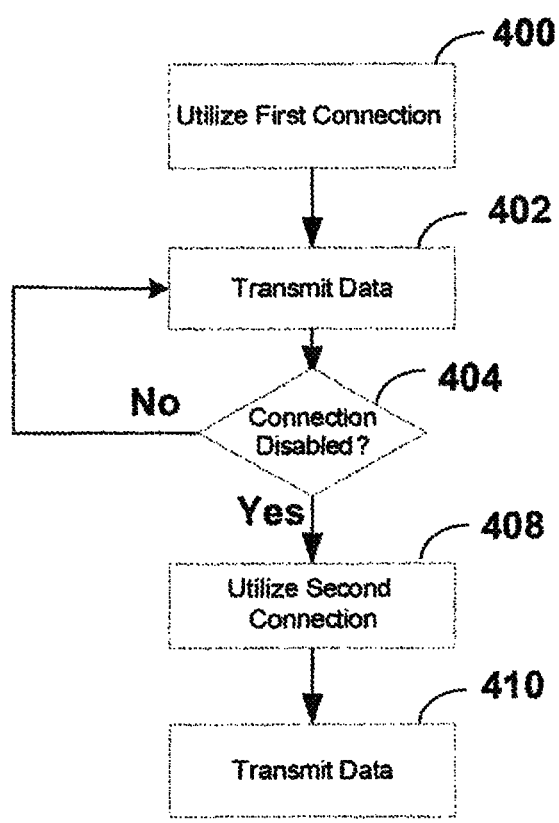
FIG. 4 illustrates an embodiment of an algorithm detailing a process flow enabled by the systems of FIG. 1 and FIG. 2.

With reference now to FIG. 4, an embodiment of an algorithm detailing a process flow enabled by system 2a of FIG. 2 for enabling a device to communicate and share network connectivity with an additional device is now described. In step 400, a first communication device may enable and/or utilize a first connection between the first communication device and a computing device via a first communication network. In step 402, the first communication device may transmit data (e.g., voice, text, video, etc) to the computing device via the first communication network. In step 404, the first communication device may determine if the first connection has been disabled. If in step 404, the first communication device may determine that the first connection has not been disabled then the data transmission process continues in step 402. If in step 404, the first communication device determines that the first connection has been disabled then in step 408, a second connection between the first communication device and a second communication device may be enabled and/or utilized. The second communication device may be connected to the computing device (e.g., via a second communication network differing from the first communication network) or via the first communication network. In step 410, the first communication device may transmit a remaining portion of the data to the computing device via the second communication device. The remaining portion of the data may include a portion of data of the data that was not transmitted to the computing device via the communication network due to the first connection being inoperable.

With reference to FIG. 5, an embodiment of an alternative system 500 for enabling interfaces 504a and/or 504b to access multiple available data transmission connections including network nodes 518a . . . 518n for transmission and/or receiving of data. A network node is defined herein as a connection point, redistribution point, or a communication endpoint. A network node may include an active electronic device that is attached to a network, and is capable of sending, receiving, or forwarding information over a communications channel. A multi-node network may include devices interconnected wirelessly, wired, or any combination therein. For example, two neighboring locations may be interconnected by a fiber optic, Ethernet, or coaxial cable as well as wirelessly. A network node may include a mesh node.

System 500 may utilize any number of the multiple available data transmission connections synchronously and/or on-demand to maximize data transmission rates/quality based on various system and user-defined parameters. Embodiments of system 500 may enable an aggregation of each available connection (or network) into a single data interface (e.g., interfaces 504a and/or 504b) comprising an approximate value of a sum of all the connections aggregated or greater (e.g., an aggregated bandwidth of all of the connections/networks), a seamless connection failover, a prioritization of connection usage based on speed, reliability, cost, etc, a prioritization of data transfer routing based on speed, reliability, etc, and message and data security.

Embodiments of system 500 of FIG. 5 may include devices 508 and 510, interfaces 504a and/or 504b, network nodes 518a . . . 518n, networks 515a . . . 515n, and network connection devices 523a . . . 523n and 531a . . . 531n. Devices 508 and 510 may comprise, inter alia, desktop computers, laptop computers, mobile phones, tablet computers, personal digital assistants (PDA), server computers, mainframe computers, cable modems, wireless routers, etc. Devices 508 and 510 may include communication interfaces associated with different data transmission methodologies such as, inter alia, wired communications, wireless LAN (802.11a,b,g,n) interfaces, microwave interfaces, satellite interfaces, cellular wireless interfaces (e.g., CDMA, 3G, 4G, etc), shortwave radio interfaces, etc. Device 508 may be connected to interface 504a (i.e., wirelessly or via a hardwire connection). Embodiments of interface 504a may be located external to device 508 as illustrated in FIG. 1. Alternatively, embodiments of interface 504a may be located internal to device 508. Embodiments of interface 504a may comprise a hardware interface, a software interface, a virtual interface, or any combination thereof. Interface 504a may comprise multiple internal buffers for storing data packets prior to transmission and as a backup for transmitted data packets that were not received by a destination device. Device 510 may be connected to interface 504b (wirelessly or via a hardwire connection). Embodiments of interface 504b may be located external to device 510 as illustrated in FIG. 1. Alternatively, embodiments of interface 504b may be located internal to device 510. Interface 504b may comprise a hardware interface, a software interface, a virtual interface, or any combination thereof. Embodiments of interface 504b may comprise multiple internal buffers for storing data packets prior to transmission and as a backup for transmitted data packets that were not received by a destination device. Embodiments of interface 504a may be connected to network connection devices 523a . . . 523n, 531a . . . 531n, and 535 via links 517a . . . 517n and 539a . . . 539n. Similarly, embodiments of interface 504b may be connected to network connection devices 523a . . . 523n, 531a . . . 531n, and 535 via links 517a . . . 517n and 539a . . . 539n.

Embodiments of the network connection devices 523a . . . 523n, 531a . . . 531n, and 535 may comprise any type of connection devices including, inter alia, a satellite dish, a wireless access point, a mobile phone, a PDA, a bridge antenna, a router, etc.

With continued reference to FIG. 5, embodiments of system 500 illustrates a data file/stream 511 split (e.g., de-multiplexed) into data packets A . . . M (by device 508) and transferred to interface 504a for transmission to interface 504b and device 510. Alternatively, data file/stream 511 may be directly transferred by device 508 to interface 504a and split up into data packets A . . . M (in real time by interface 504a) for transmission to interface 504b and device 510. Each, some, or at least one of packets A . . . M may be stored within one or more data buffers internal to interface 504a prior to transmission to interface 504b. For instance, packets A . . . M may be stored within the data buffers to enable transmission of the data packets A . . . M. Additionally, data packets A . . . M may be stored in the data buffers so that any of packets A . . . M may be transmitted again if the packet has not been received by a destination device (e.g., interface 504*b*). Each, some, or at least one of packets A . . . M (or some of data packets A . . . M) may be transmitted to a different one of network connection devices 523*a* . . . 523*n*, 531*a* . . . 531*n*, and 535 for transmission on a different one of networks 515*a* . . . 515*n*. Transmitting different data packets of a data file (e.g., data 511) on different networks may allow for an aggregation of bandwidth from multiple networks as described, supra with respect to FIG. 1. Additional characteristics may be evaluated with respect to transmission of different data packets of a data file (e.g., data 511) on different networks. Characteristics may include, inter alia, throughput characteristics, packet drop rate characteristics, error characteristics, latency characteristics, packet delay variation characteristics, and out-of-order-delivery characteristics. A throughput characteristic defines a bit rate (i.e., a maximum throughput) that may be provided on a specified data channel. A packet drop rate characteristic defines multiple packets transmitted that do not arrive at a destination. Error characteristics define corrupted packets that are dropped en-route to their destination. Latency characteristic define a time elapsed with respect to a packet to be delivered to its destination. A packet delay variation (i.e., jitter) defines a difference in delay (or latency) between packets on a single channel. For example, if packets A, C, and E are transmitted on channel 1 and packet A arrives in 20 ms, packet C arrives in 200 ms, and packet E arrives in 75 ms, channel 1 would be considered to comprise a high packet delay variation. Out of order delivery characteristics define packets transmitted on a same channel that arrive out of order.

System 500 enables any of network nodes 518*a* . . . 518*n* to connect to n other network nodes via wired or wireless connections. Additionally, each network node may connect to an Internet gateway provided by an internet service provider or other connection that exits within a local network. The aforementioned connection enables any internet-enabled device connected to any wired or wireless access point within a network to utilize any Internet gateway connected to the network and a matching system combined with the network thereby enabling any Internet-enabled device to utilize multiple gateways concurrently to enable bandwidth aggregation and/or failover functionality or other connection-optimized performance.

System 500 enables:

1. Packets A-M to be transmitted from device 508 to interface 504*a*.
2. Interface 504*a* to connect to any of network connection devices 523*a* . . . 523*n*, 531*a* . . . 531*n*, and 535 via any of links 539*a* . . . 539*n* and transmit any number of packets to each of network connection devices 523*a* . . . 523*n*, 531*a* . . . 531*n*, and 535.
3. Any of network nodes to 518*a* . . . 518*n* to further divide packets A . . . M into sub packets.
4. Any of network nodes to 518*a* . . . 518*n* to transmit packets A . . . M (or associated sub packets) through any other of network nodes 518*a* . . . 518*n* connected directly to an associated network node based on a pre-determined route established by system 500 previous to packets leaving interface 504*a*. Additionally, each of network nodes 518*a* . . . 518*n* may transmit packets A-M to any other connected network node based on a real-time or near-real-time evaluation of available routes to external gateways, an evaluated performance of internal network links and paths, and a performance of the gateways. System 500 may evaluate routes from every network access point to all internet gateways available within the network and assign channels within the network for each connected Internet-enabled device (e.g., network connection devices 523*a* . . . 523*n*, 531*a* . . . 531*n*, and 535) based on evaluation of a most efficient path to Interface 504*b*.
5. Routes to be pre-determined at a time of connection establishment or at each of network nodes 518*a* . . . 518*n* when packets arrive. System 500 may continually evaluate every network node to network node link and every combination of links to establish every possible available channel out of the network to Interface 504*b* and the performance of each of those channels.
6. Packet streams to be subdivided at any network node for transmission to other network nodes or to an external gateway.
7. Packets to be subdivided at any network node to enhance performance.

Embodiments of system 500, via interface 504*a* and/or 504*b*, may enable any one or a combination of the following functions:

1. A user may connect to the Internet via a network-integrated access point. A connection to the system 500 allows for communication with interface 504*a* with available channels through a network node to interface 504*b*. Additionally, a quality of each channel as evaluated by the system 500 at a time of system initiation on internet-enabled device or on a real-time or near-real-time basis is communicated.
2. A user's system initiates packet transmission to a local interface. For packets transmitted to a network connection connected to interface 504*a*:
A. System 500 may assign packets to each network channel based on a performance/availability of each network channel. Channel assignment may occur on an internet-connected device, a network router that the internet-connected device is connected to through a wired or wireless connection, etc. Channel/path selection may take place at an initial connection point or may be modified on each network node independently. Each network node may choose to transmit one or more packets through its associated internet gateway or to a connected network node.

With reference to FIG. 6, an embodiment of an alternative system 600 for pooling connections as if they comprise a single connection. Pooling connections may include:

1. Assigning a program data stream (e.g., a video chat session) to use a specified single existing connection/socket all the time (e.g., only a Wifi connection) if the specified single existing connection/socket comprises a most reliable channel. Additional program data streams (e.g., email) are assigned to use other existing connections/sockets.
2. Assigning all program data streams to a best available specified single existing connection/socket at any given moment.

Additionally, system 600 enables a process for transmitting duplicated data via multiple channels to ensure arrival or enhance a speed of arrival of packets. System 600 may transmit identical data streams or duplicate packets via two or more channels to ensure arrival thereby reducing a need to retransmit data if packets do not arrive or arrive too late. System 600 may additionally determine a priority of packets (e.g., important packets vs. unimportant packets). For example, a packet on a voice over ip video call would be more important than a packet associated with an email in terms of timing/speed of delivery. System 600 may transmit duplicate packets over underutilized channels (in terms of bandwidth availability) for increasing performance. System 600 may additionally determine a wait period for transmission of non-priority data.

Embodiments of system 600 of FIG. 6 may include devices 612a ... 612n and 610, interfaces 604a ... 604n and 605, networks 615a ... 615n, and network connection devices 623a ... 623n and 635. Devices 612a ... 612n and 610 may comprise, inter alia, desktop computers, laptop computers, mobile phones, tablet computers, personal digital assistants (PDA), server computers, mainframe computers, cable modems, wireless routers, etc. Devices 612a ... 612n and 610 may include communication interfaces associated with different data transmission methodologies such as, inter alia, wired communications, wireless LAN (802.11a,b,g,n) interfaces, microwave interfaces, satellite interfaces, cellular wireless interfaces (e.g., CDMA, 3G, 4G, etc), shortwave radio interfaces, etc. Device 612a may be connected to interface 604a (i.e., wirelessly or via a hardwire connection). Embodiments of interface 604a may be located external to device 612a as illustrated in FIG. 6. Alternatively, embodiments of interface 604a may be located internal to device 612a. Devices 612a ... 612n and 610 may be connected to interfaces 604a ... 604n and 605, respectively (i.e., wirelessly or via a hardwire connection). Interfaces 604a ... 604n and 605 may be located internal or external to Devices 612a ... 612n and 610. Embodiments of interfaces 604a ... 604n and 605 may comprise a hardware interface, a software interface, a virtual interface, or any combination thereof. Interfaces 604a ... 604n and 605 may comprise multiple internal buffers for storing data packets prior to transmission and as a backup for transmitted data packets that were not received by a destination device. Embodiments of interfaces 604a ... 604n and 605 may be connected to Devices 612a ... 612n and 610 via links 617a ... 617n. Similarly, embodiments of interface 604b may be connected to network connection devices 612a ... 612n and 610 via links 617a ... 617n.

System 600 allows a pool of connections to enable each connection request from a client computer (or other internet-capable device) to use a single available channel for a single connection. In this instance, a request is executed by the client computer and system 600 determines a best available channel for assigning the request based on specified criteria such as channel availability (e.g., bandwidth, latency, etc), a current usage of the channel, a historical reliability of the channel, a type and priority of data that will be passed through the channel by tan end device (e.g., udp vs. tcp, real-time vs. file transfer, etc). Additionally, each connection request may be bound to a single channel for the life of the connection or the life of the channel thereby enabling a single device to utilize many available channels. For example, each tab on a browser or each browser window may be assigned an independent channel such as a video chat application may be assigned another independent channel, an FTP program could be assigned another separate channel, etc. System 600 allows one or more devices to share any available channels amongst participating devices and system 600 will determine a best use of the available channels for each request. Each client machine may be connected through wireless or wired connections in a master/slave or peer-to-peer relationship.

Moreover, embodiments of system 600 comprise devices 612a, 612n, and 612b (all on a same Wi-Fi network) connected to each other through a device 635 (i.e., a local Wi-Fi access point) connected to the Internet through a modem and an ISP as well as to a wireless network via network antennas. Devices 612b and 612c are connected directly to each other via a Wi-Fi direct connection. Devices 612b, 612c, and 612n may each comprise independent connections to cellular service providers. Device 312a requests a separate connection for application A (e.g., a video conferencing application), application B (e.g., a browser connection), and application C (e.g., a file download). For each connection, system 600 determines a best channel to assign the connection request based on the type of data being transferred and the viability of the different channels available to system 600. Each connection is assigned a channel by device 612a's interface. A channel may comprise a single point-to-point link, wherein a path is evaluated and modified at each hop. Alternatively, a channel may comprise an end point to end point channel depending on system 600 setup. Additionally, system 600 may be designed in a master/slave architecture so that one device on the system acts as a master to all connected devices and coordinates all channel evaluation and assignment. Alternatively, system 600 may be designed in a peer to peer architecture where each device within the system is capable of channel evaluation, channel assignment, enabling seamless failover, and other system tasks.

With further reference to the drawings, FIG. 7 illustrates an embodiment of an algorithm detailing a process flow enabled by system 600 of FIG. 6 pooling connections as if they comprise a single connection. In step 700, a first interface device receives a plurality of data streams. In step 704, each data stream is assigned to a different communication device of a plurality of communication devices. The communication devices are communicatively coupled to the first interface device and each communication device is associated with a communication network of a plurality of communication networks. In step 704, a first data stream of the plurality of data streams is transmitted to a first communication device. The first data stream is transmitted from the first communication device to a second interface device via a first communication network associated with the first communication device. In step 708, a second data stream is transmitted to a second communication device of the plurality of communication devices, the second data stream is transmitted from the second communication device to the second interface device via a second communication network of the plurality of communication networks associated with the second communication device. The first data stream differs from the second data stream. The first communication device differs from the second communication device and the first communication network differs from the second communication network. Alternatively in step 708, the first data stream is transmitted to a second communication device of the plurality of communication devices. The first data stream is transmitted from the second communication device to the second interface device via a second communication network of the plurality of communication networks associated with the second communication device. The first communication device differs from the second communication device. The first communication network differs from the second communication network.

Referring still to the drawings, FIG. 8 illustrates an embodiment of a computer apparatus 90 used by embodiments of system 2 of FIG. 1, embodiments of system 2a of FIG. 2, embodiments of a system 500 of FIG. 5, and embodiments of a system 600 of FIG. 6 for enabling interfaces to access multiple available data transmission connections. Embodiments of the computer system 90 may include a processor 91, an input device 92 coupled to the processor 91, an output device 93 coupled to the processor 91, and memory devices 94 and 95 each coupled to the processor 91. The input device 92 may be, inter alia, a keyboard, a mouse, microphone, etc. The output device 93 may be, inter alia, a printer, a plotter, a computer screen, cell phone screen, a tablet display, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes code enabled for enabling interfaces to access multiple available data transmission connections. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may comprise computer code and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or the program storage device).

While FIG. 8 shows an embodiment of a computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

The invention claimed is:

1. A method comprising:
receiving, by a first interface device comprising a computer processor, first data;
dividing, by the computer processor, the first data into a plurality of data packets;
storing, by the computer processor, the plurality of data packets in one or more data buffers comprised by the first interface device;
transmitting, by the computer processor, a first group of data packets of the plurality of data packets to a first network node communicatively coupled to the first interface device, wherein a first subgroup of data packets of the first group of data packets is transmitted from the first network node to a second interface device via a first communication network associated with the first network node, wherein the first subgroup of data packets comprises at least one data packet, wherein the first subgroup of data packets does not comprise all data packets of the first group of data packets, and wherein the first network node comprises a first plurality of communicatively coupled communication devices; and
transmitting, by the computer processor, a second group of data packets of the plurality of data packets to a first communication device communicatively coupled to the first interface device, wherein the second group of data packets are transmitted from the first communication device to the second interface device via a second communication network associated with the first communication device, wherein the second interface device stores the first subgroup of data packets and the second group of data packets within an internal data buffer, wherein the first subgroup of data packets differ from the second group of data packets, wherein the first communication device differs from the first plurality of communicatively coupled communication devices, and wherein the first communication network differs from the second communication network;
wherein the first communication network and the second communication network are selected for transmitting the first subgroup of data packets of the first group of data packets and the second group of data packets, respectively, based on a determination of a data transfer viability of the first communication network and the second communication network, the data transfer viability determination including an analysis of a historical performance of the first communication network and the second communication network.

2. The method of claim 1, wherein the second interface device re-generates the first data by combining the first subgroup of data packets and the second group of data packets.

3. The method of claim 1, wherein a second subgroup of data packets of the first group of data packets is transmitted from the first network node to a second network node interface device via a third communication network associated with the second network node, wherein the second network node comprises a second plurality of communicatively coupled communication devices differing from the first plurality of communicatively coupled communication devices.

4. The method of claim 3, wherein the second subgroup of data packets is divided into a first micro-group of data packets and a second micro-group of data packets, wherein the first micro-group of data packets is transmitted from the second network node to a third network node via a fourth communication network associated with the third network node, wherein the third network node comprises a third plurality of communicatively coupled communication devices differing from the first plurality of communicatively coupled communication devices and the second plurality of communicatively coupled communication devices, and wherein the first micro-group of data packets are transmitted from the third network node to the second interface device via a fifth communication network associated with the fifth communication network associated with the third network node.

5. The method of claim 4, wherein the second micro-group of data packets is transmitted from the second network node to a second communication device, wherein the second micro-group of data packets are transmitted from the second communication device to the second interface device.

6. The method of claim 1, wherein the first communication device comprises an Internet gateway.

7. The method of claim 1, further comprising:
performing, by said computer processor, a real time evaluation process with respect to a performance of all available network nodes and communication devices for transmission of the plurality of data packets;
selecting, by the computer processor based on results of said real time evaluation process, the first network node for said transmitting said first group of data packets; and
selecting, by the computer processor based on the results of said real time evaluation process, the first communication device for said transmitting said second group of data packets.

8. The method of claim 1, wherein the first interface device comprises a discrete device.

9. The method of claim 1, wherein the first interface device is comprised by a computing apparatus.

10. The method of claim 9, wherein the computing apparatus comprises an apparatus selected from the group consisting of: a personal computer, a laptop computer, a tablet computer, a game console, a WiFi mobile device, a portable media player, a PDA, a server, a router device, and a cellular telephone.

11. The method of claim 1, wherein the first communication device and the first plurality of communicatively coupled communication devices each comprise a device selected from the group consisting of a satellite dish, a wireless access point, a PDA, a hardwired router, a radio transmitter/receiver, an infra-red communication device, a microwave dish, and a cellular telephone.

12. The method of claim 1, further comprising:
first polling, by the computer processor, the first network node and the first communication network;
second polling, by the computer processor, the first communication device and the second communication network; and
determining, by the computer processor based on results of the first polling and the second polling, the data transfer viability of the first network node, the first communication network, the first communication device and the second communication network.

13. The method of claim 12, further comprising:
polling, by the computer processor, n network nodes, n communication devices, and n associated networks; and
determining, by said computer processor based on results of said polling, a data transfer viability of each communication device of the n communication devices, each network node of the n network nodes, and each associated network of the n associated networks.

14. The method of claim 13, further comprising:
analyzing, by the computer processor, historical data associated with previous connections to the n associated networks.

15. The method of claim 12, further comprising:
analyzing, by the computer processor, historical data associated with previous connections to the first communication network and the second communication network, wherein the determining is further based on results of the analyzing.

16. The method of claim 12, wherein the first polling and the second polling occur simultaneously.

17. The method of claim 12, wherein the first polling and the second polling occur sequentially.

18. The method of claim 12, further comprising:
receiving, by the computer processor from an external source, analyzed historical data associated with previous connections to the first communication network and the second communication network.

19. The method of claim 1, wherein the first communication network comprises first characteristics, wherein the second communication network comprises second characteristics, and wherein the transmitting the first group of data packets and the transmitting the second group of data packets results in generating aggregated characteristics greater than characteristics of any single communication network.

20. The method of claim 1, further comprising:
transmitting, by the computer processor, a data packet x of the plurality of data packets to any communication device and associated network coupled to said first network node.

* * * * *